Aug. 23, 1966 H. H. AST 3,268,889

INDICATOR UNIT AND SWITCH

Filed April 20, 1964 4 Sheets-Sheet 1

INVENTOR:
Herbert H. Ast

By Keith D. Beecher
Attorney

INVENTOR:
Herbert H. Ast

By Keith D. Beecher

Attorney

Aug. 23, 1966 H. H. AST 3,268,889

INDICATOR UNIT AND SWITCH

Filed April 20, 1964 4 Sheets-Sheet 3

INVENTOR.
Herbert H. Ast

By Keith D. Beecher

Attorneys

Aug. 23, 1966 H. H. AST 3,268,889

INDICATOR UNIT AND SWITCH

Filed April 20, 1964 4 Sheets-Sheet 4

INVENTOR:
Herbert H. Ast
By Keith D. Beecher
Attorney

United States Patent Office 3,268,889 Patented August 23, 1966

3,268,889

INDICATOR UNIT AND SWITCH

Herbert H. Ast, Pacific Palisades, Calif., assignor to Radar Relay, Inc., Santa Monica, Calif., a corporation of California Filed Apr. 20, 1964, Ser. No. 361,054
8 Claims. (Cl. 340—378)

The invention relates to electrical indicator units, and it relates more particularly to an improved indicator of the annunciator type which is capable of multi-colored indications and which may also include an internal switch actuating mechanism.

The indicator unit of the invention is particularly useful, for example, in automatic check-out systems for missile guidance. The unit also find utility in connection with computers, data processors, and other similar electrical and electronic equipment.

The unit to be described is capable of producing an indication in either a single color, or in any of a multiplicity of colors. For example, the unit may be constructed to include a "red" indication to show a mulfunction or dangerous condition; a "yellow" indication to show a marginal condition; and a "green" indication to designate an operative condition.

The different colored indications mentioned in the preceding paragraph are provided by including individual filters for each of a multiplicity of lamps in the unit; and by causing different ones of the lamps to be energized, in conformance with the particular state of the equipment being monitored.

The utility of the unit, however, is naturally not limited to such colors, or to such uses, or to a multiplicity of colors. Moreover, the unit may be adapted, if so desired, to provide different indications at different areas on the screen.

The indicator assembly to be described herein includes, as mentioned above, an associated switch actuating mechanism. This mechanism serves to actuate a switch, merely by depressing the front face of the indicator unit, when the unit is mounted on a control panel. This switch actuating mechanism in the unit is useful, in that it permits the operator to initiate a predetermined course of action in response to a particular indication by the unit.

A particular feature of the improved indicator assembly to be described is the manner in which it can be opened for relamping or other purposes. The assembly itself can be mounted so that its front face is flush with the mounting panel. Then, to open the unit, the front face is shifted in the plane of the mounting panel by inserting the finger nail in a convenient groove.

The above mentioned operation, as will be described in some detail, causes the switch actuator portion of the assembly to be released and to pop out, so that it may be easily removed. The structure is so conceived that there is no tendency for the switch actuator to be released during normal operation of the assembly. Moreover, unlike the prior art units, it is possible to restore the switch actuator to its normal operating position after a re-lamping operation, for example, without inadvertently operating the switching mechanism of the assembly.

Another advantage of the unit described above is that a plurality of like units can be mounted adjacent one another without any need to provide access between the individual units. Such access is normally required in the prior art units so as to permit the front face to be removed for re-lamping or other purposes.

Another feature of the invention is that the unit to be described is constructed to accept a wide range of buttons and/or nomenclature strips in its front face. These may be round, square, rectangular, or the like, for identification purposes; and they may be flush with the panel, as described, or they may protrude out from the panel. However, the flush capabilities of the unit of the invention are usually desirable, since it militates against accidental operation of the switching mechanism therein.

A further feature of the invention is that when the unit is opened, as described above, the lamps and other internal components are accessibly revealed. The lamps, and associated filters and the like, can then be conveniently removed and replaced without the need for tools of any type.

A still further feature of the invention is the provision of such an assembly which is capable of accepting switches of, for example, from 1–6 pole; and which incorporates a unique operating mechanism which permits alternate or momentary operation of the switches, or a combination of both.

The unit of the invention can be constructed to have relatively small transverse dimensions, as compared with the prior art units of the same general type. Also, it can be constructed to have smoother sides, free of protuberances, so as to facilitate matrix mounting of the units.

An object of the invention, therefore, is to provide an improved indicator-switching assembly which includes removable electrically energized lamps, and which may be of the annunciator type.

A more particular object of the invention is to provide such an improved indicator assembly which is capable of multi-color indications.

Yet another object of the invention is to provide such an improved indicator assembly which is constructed so that the electric lamps therein may be easily removed for replacement purposes.

A still further object of the invention is to provide such an improved indicator assembly which is simple in its construction, and which is relatively low in cost.

Another object of the invention is to provide such an improved indicator assembly which is constructed to permit the convenient interchange of color filters so that each unit may be readily adapted to be useful in a wide variety of purposes.

A further object of the invention is to provide such an improved indicator which may be constructed to provide segmented indications on its display surface, as mentioned above.

A further object of the invention is to provide such an improved indicator unit which can be readily converted to various types of assemblies. This latter objective is realized by providing a modular construction which permits a variety of sub-assemblies to be incorporated as different overall assemblies. These sub-assemblies may include, for example, electro-magnetic switch holding units, diode rectifier units, and so on.

In the drawings:

FIGURE 11 is an exploded view of further components of the unit of FIGURE 1;

FIGURE 14 is a perspective view of a further modular unit which may be incorporated into the unit of FIGURE 1 to house diodes, dropping resistors, and the like;

Figures 1, 2:
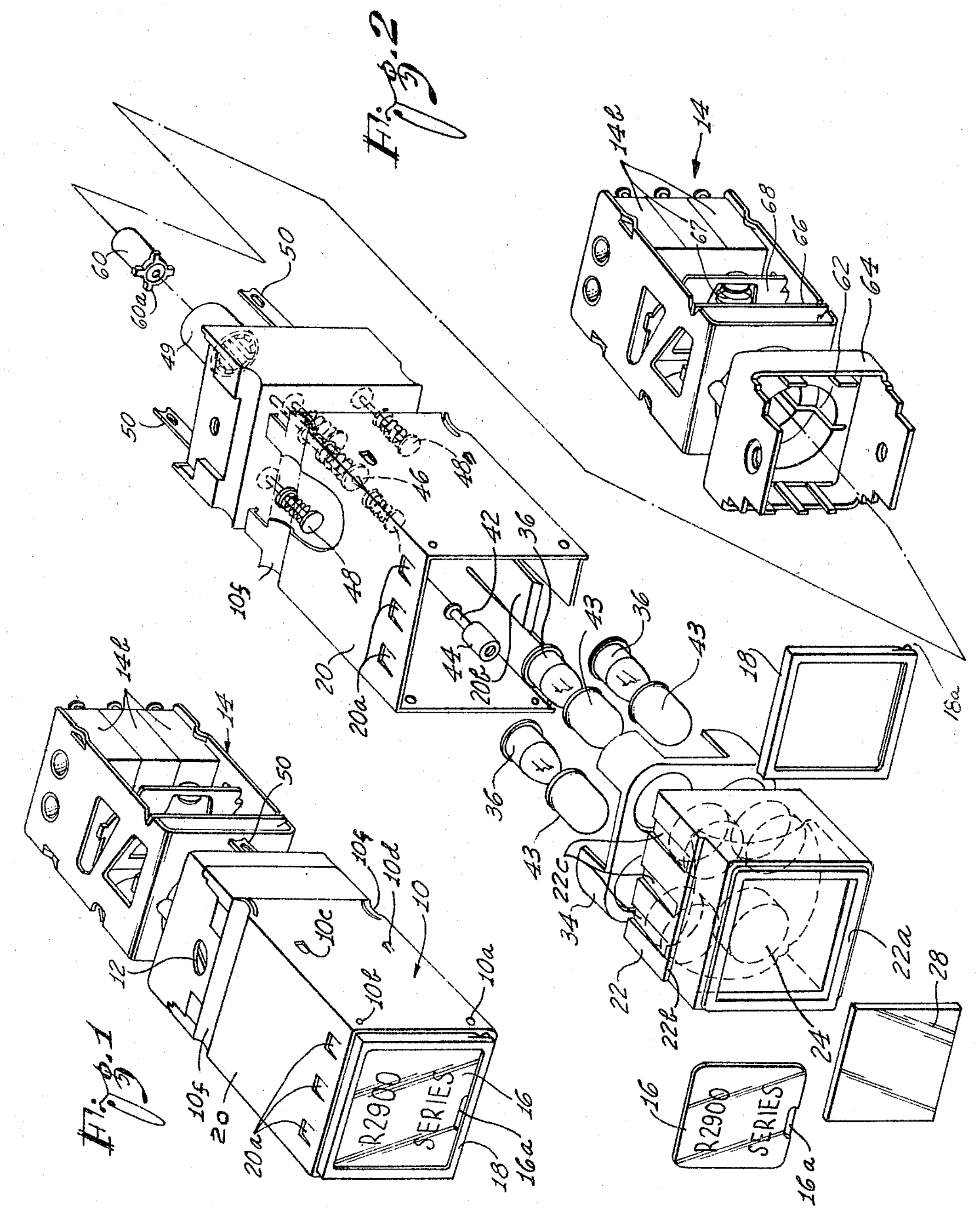
FIGURE 1 is a perspective view of a modular unit constructed in accordance with one embodiment of the invention.
FIGURE 2 is an exploded view of the unit of FIGURE 1, illustrating in perspective, the various components included in the unit of FIGURE 1.

One embodiment of the invention is designated in FIGURE 1 as 10. It will be observed that the unit 10 is of a modular construction, in that it includes a solid rectangular unit. The unit is configured to permit other similar units to be attached to it, as by appropriate screws such as the screw 12. In the illustrated embodiment, a switch 14 is mounted on the end of the modular unit 10. As will be described, the other modular units may be interposed between the unit 10 and the switch 14.

The unit 10 is an indicator which may be of the annunciator type. For example, a plurality of electrically energized lamps, as will be described, may be included in the unit 10, and these lamps may be selectively energized. When selected ones of the lamps are energized, an indicia bearing member 16, mounted on the front of the unit 10 in an appropriate bracket 18, becomes illuminated in a corresponding color.

The unit 10 also includes a switch-actuating mechanism, as will be described, and this mechanism is operated merely by pushing the indicia bearing member 16 inwardly against a spring tension which is provided in the unit.

The particular unit of FIGURE 1 includes, as shown in FIGURE 2, a casing 20. The casing 20 may be formed of an appropriate metal; whereas the housing 22 may be formed of a suitable insulating material, such as, for example, a polycarbonate plastic. A suitable plastic for this purpose is "Lexan," a material marketed by General Electric under that trade name.

The housing 22 has a flange **22*a* formed on its front face, and the flange 22*a* receives the bracket 18. The bracket 18 may be slipped across the flange 22*a*, and it may support the indicia bearing member 16. The bracket 18 is held in place, releasibly, by spring fingers 18*a* which engage grooves in the rim of the flange 22*a*. A lens 24 (FIGURE 6) may be mounted in the housing 22, and this lens is supported in the housing on shoulders 26** (FIGURE 4) which are formed in the housing about midway along its length.

A single color filter 28 may be interposed between the member 16 and the front face of the lens 24, when a single color indication is desired. This filter may be replaced with a diffusing plate, when no color filter is required.

Figures 3, 4, 5, 6, 7, 8, 9, 10, 12, 13:
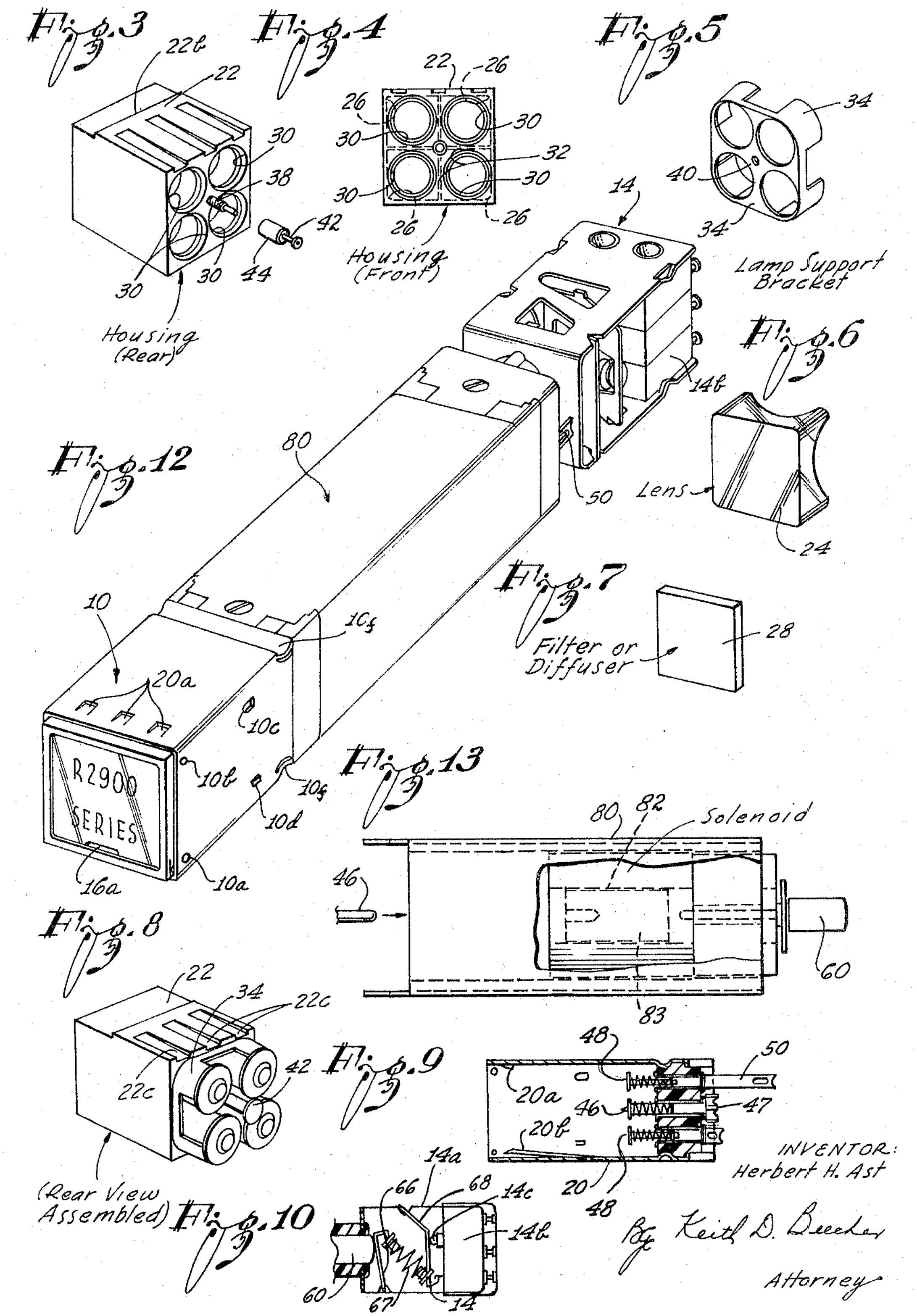
FIGURE 3 is a rear perspective view of one of the components of the assembly of FIGURE 2.
FIGURE 4 is a front view of the components of FIGURE 3.
FIGURE 5 is a perspective view of a lamp supporting bracket included in the assembly.
FIGURE 6 is a perspective view of a lens element which is included in the assembly of FIGURE 2.
FIGURE 7 is a perspective view of a filter or diffuser member which may be included in the assembly.
FIGURE 8 is a rear perspective view of a portion of the assembly of FIGURE 2, showing the assembly in an assembled condition.
FIGURE 9 is a sectional view of one of the portions of the assembly of FIGURE 2.
FIGURE 10 is a side view of a switch which is mounted on the assembly.
FIGURE 12 is a perspective view of the unit of FIGURE 1, modified to incorporate a further modular unit interposed between the components illustrated in FIGURE 1.
FIGURE 13 is a fragmentary view of the interposed modular unit of FIGURE 12.

As shown in FIGURE 4, the housing 22 includes a multiplicity of lamp receiving apertures 30. These apertures extend from the rear face of the housing about half way through the housing, as shown in FIGURE 3.

The housing 22 also includes transverse slots 32 (FIGURE 4), and these slots are adapted to receive removable partitions. When so desired, the lens 24 may be removed, and various partitions may be incorporated in the housing 22. Then, individual indications corresponding to the individual lamps may be shown individually or simultaneously on different sections of the front face of the unit.

The electric lamps 36 are supported in a metallic lamp support bracket 34. This bracket is formed of an electrically conductive material, and it is shown, for example, in FIGURES 2 and 5. The lamp supporting bracket 34 has a plurality of lamp-receiving apertures therein in respective axial alignment with the apertures 30 in the housing 22. A corresponding plurality of lamps 36 may be received in the apertures of the lamp supporting bracket. The sides of the bases of the lamps 36 make electrical contact with the bracket 34, so that electrical contact may be established to the various lamps.

The lamp-supporting bracket 34 is held on the rear face of the housing 22 by means of a pin 38. The pin 38 is mounted in the housing 22, and this pin extends outwardly from the rear face of the housing. The pin 38 also extends through a central hole 40 in the bracket 34. An actuating pin 42 having an internal thread is threaded onto the pin 38, and the pin 42 serves to hold the bracket 34 in place on the rear face of the housing 22, as best shown in FIGURE 8.

When so desired, each lamp 36 may be equipped with a separate color filter. These take the form of rubber-like cup-shaped colored filters 43 (FIGURE 2). The filters 43 extend through the apertures in the lamp-receiving bracket 34 and into the apertures 30 of the housing 22. Each of the lamps 36 extends into the corresponding filter 43. In this manner, whenever any one of the lamps 36 is energized, the indicia on the member 16 glows in the particular color corresponding to that filter.

The housing 22, as mentioned above, is slidably received in the casing 20 in a telescopic relationship. The pin 42 (FIGURE 2) has a sleeve 44 surrounding it, so that contact may be established to the various lamps 36.

The pin 42 engages a spring-loaded pin 46 which is mounted on the rear wall of the casing 20 (FIGURE 9). The pin 46 has a pointed end, and this end is received by a corresponding depression in the pin 42. The spring-loaded pin 46 normally biases the pin 42, and the housing 22 to a flush position, as shown in FIGURE 1.

However, when the member 16 is depressed inwardly, the housing 22 is forced into the casing 20. This causes the pin 52 to move the pin 46 against its spring loading, so that the pin 46 may move through the rear face of the casing 20.

The casing 20 also includes a plurality of spring-loaded electric contacts 48. These latter spring-loaded contacts are in axial alignment with respective ones of the lamps 36, and they engage the contact buttons on the ends of the respective lamps. In this manner, electrical connection may be established between the electric terminals 50 and respective ones of the lamps through the corresponding spring-loaded contacts 48; whereas a common connection is established through the pins 46 and 42, and through the sleeve 44 and the bracket 34.

The rear end portion of the pin 46 extends into a plunger 60 (FIGURES 2 and 10) which, in turn, extends through an aperture 62 in a mounting bracket 64. The mounting bracket 64 supports the switch 14, the bracket being supported on the unit 10 by the aforementioned screws, such as the screws 12.

The pin 46 is normally spring biased, so that the plunger 60 is in its stand-by position. However, when the switch actuating mechanism is actuated, so that the housing 22 is moved back into the casing 20, the pin 42 engages the pin 46 which, in turn, causes the plunger 60 to move against an actuating mechanism of the switch 14. The switch 14 is of usual construction, and may take any of a variety of configurations.

As shown in FIGURES 2 and 3, the housing 22 has a shoulder **22*b* formed in its upper face. A group of fingers are punched out of the upper surface of the casing 20 to form downwardly extending lances 20*a*. A further finger 20b is punched out of the lower surface of the casing 20 to form a leaf spring. This leaf spring engages the under side of the housing 22 so that the housing is biased upwardly in the casing 20. This causes the shoulder 22b of the housing 22 normally to bear against the lances 20a, as the spring biased pin urges the housing forwardly in the casing 20. The housing 22 in this manner is normally retained in the casing 20**, with its front face flush with the end of the casing in the illustrated embodiment.

The member 16 is provided with a groove 16a, so that when it is desired to withdraw the housing 22 from the casing 20, the serviceman places his thumb-nail in the groove 16a and displaces the housing 22 down in the casing 20 against the tension of the spring 20b. This frees the shoulder 22b from the lances 20a and the housing pops out. Grooves 22c are provided in the top surface of the housing 22 to permit free passage of the lances 20a as the housing is moved out of the casing by the spring loaded pin 46.

It will be appreciated that the assembly described above permits the housing 22 to be withdrawn from the casing 20 for relamping, or other purposes, without any need for the sides of the housing to be initially grasped by the service man. Instead, the above-described manipulation causes the housing to pop out of the casing 20 to a position where it can be easily withdrawn. This permits a flush construction for the face of the housing and no access portion around its rim, for withdrawal purposes, is required.

In addition, the aforementioned downward manipulation required for releasing the housing, precludes any tendency for the housing to be released during normal operation of the switching mechanism. Moreover, the housing can easily be replaced in the casing without inadvertently operating the switching mechanism.

When the housing 22 is removed from the casing 20, as shown in FIGURE 2, the lamps and their associated filters are readily accessible. The lamps can be replaced manually, on an individual basis, and no tools are required for this replacement.

Dimples and projections 10a and 10b are formed in the sides of the casing so as to lock a mounting bracket. This bracket may be of the type described, for example, in copending application Serial No. 363,767, filed April 30, 1964.

As best shown in FIGURE 1, the sides of the indicator unit are made smooth, and there are no protuberances. This permits a plurality of like units to be assembled into a matrix. A small outward projection 10d is formed on each of the sides of a unit, and this projection engages a mating dimple 10c on the adjacent unit. These projections and dimples serve to prevent shifting and rotation of the individual units in the matrix. It will be appreciated that the hidden side of the unit 10 in FIGURE 1 also has a projection 10d and a dimple 10c, but in inverted positions with respect to those of the illustrated side.

Recesses in the form of grooves 10f are provided in the top and bottom of the unit. These grooves form passageways when like units are stacked on top of one another into a matrix. The passageways receive screws which hold straps around the matrix, so as to hold the matrix in an assembled condition.

As best shown in FIGURE 10, the switch 14 includes a pair of spring-loaded actuating plates 66 and 68. When the plunger 60 moves against the plate 66, it causes the plate 68 to move from one position to the other. The latter plate, in one of its positions, actuates the switch 14 to a particular electrical state, whereas in its other position, it actuates the switch 14 to its opposite state.

As shown in FIGURE 10, the plates 66 and 68 are pivotally mounted in the frame 14a of the switch 14. When the plunger 60 is fully retracted, as shown in FIGURE 10, the switch spring 67 biases the plate 68 against the spring-loaded switch buttons 14c of the switch 14b. However, when the plunger 60 is moved to the right in FIGURE 10, the resulting pivoting action of the plate 66 causes the spring 67 to shift and draw the plate 68 away from the buttons 14c. This action of the plunger 60, therefore, causes the switch 14b to be actuated between a first and a second condition.

The assembly illustrated herein is constructed, as will be described, so that when the plunger 60 is first moved to the right in FIGURE 10 and then released, it does not return to its fully retracted position. Rather it returns to an intermediate position in which the relative position of the plates 66 and 68 is such that the plate 68 is held away from the buttons 14c. This means that the switch 14b, instead of being held in its second condition only as long as the plunger 60 is held in its extended position, continues to be held in its second condition until the plunger is again actuated.

Figures 11, 14:
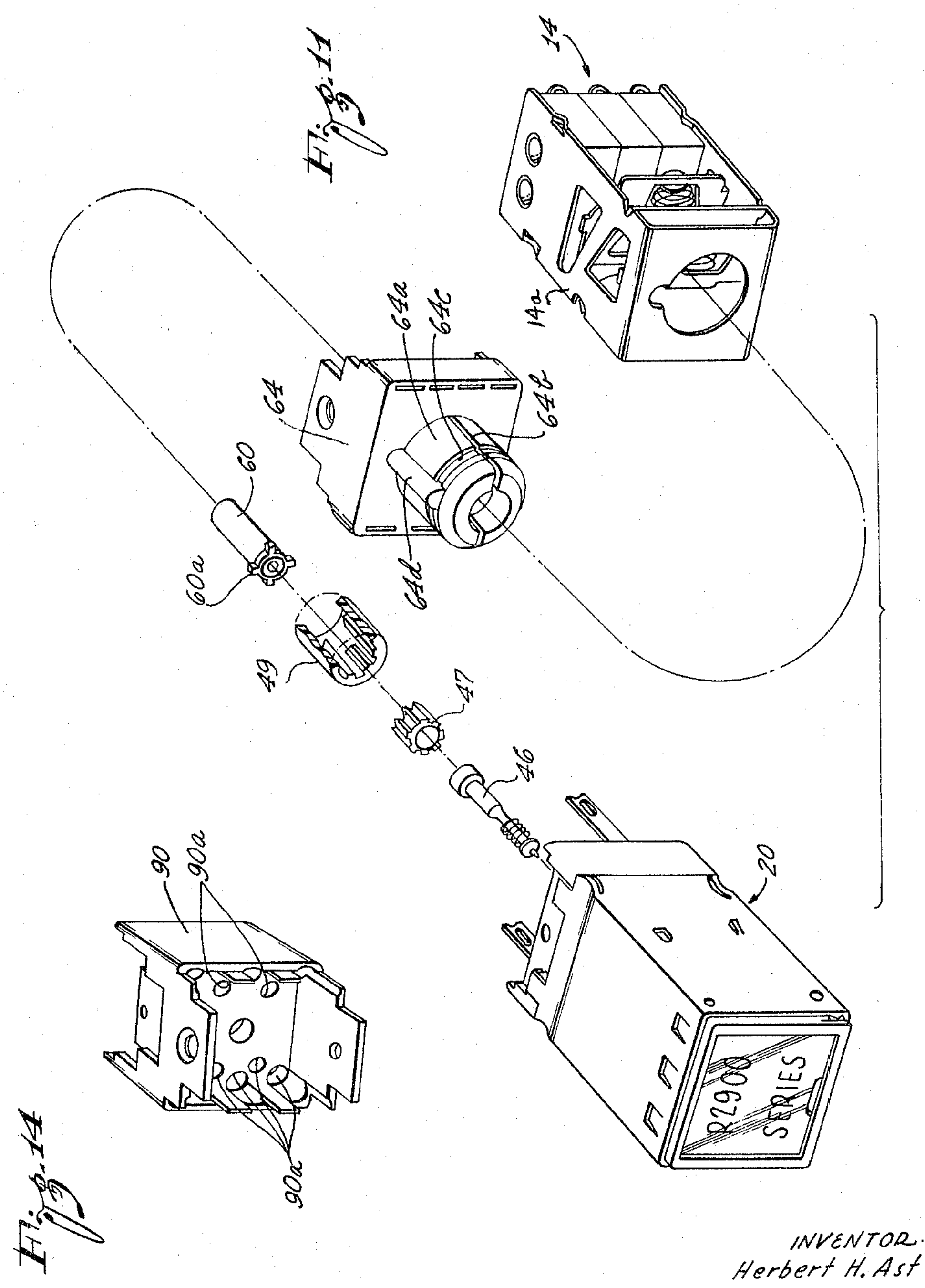

The above-mentioned action is achieved by the components illustrated in the exploded view of FIGURE 11. The switch 14 itself, is mounted on the mounting bracket 64. The mounting bracket 64 may be composed of a resilient plastic material and it includes an integral neck portion 64a. The neck portion 64a is split, as at 64b, and it includes an annular channel 64c at its extremity. This channel 64c fits into an aperture in the switch frame 14a, and the arrangement is such that the switch frame may conveniently be snapped into place on the end of the neck portion 64a. A locating boss 64d extends down one side of the neck portion 64a to serve as an indexing means for the proper angular positioning of the switch 14.

As also shown in FIGURE 11, the rear end of the pin 46 protrudes from the rear of the casing 20, and a toothed member 47 is mounted on the protruding end. The toothed member 47 is in the form of a gear. The protruding end of the pin 46 and the toothed member 47 extend into a tubular member 49. The member 49 is positioned in the neck portion 64a of the bracket 64. The inner surface of the tubular member 49 has longitudinal guides and shoulders formed therein.

A member 60a is mounted on the end of the plunger 60. This member 60a has radial teeth which ride in the guideways formed on the inner surface of the tubular member 49 and which engage the teeth of the member 47.

The action is such that the plunger 60 may be initially retracted to the left hand end of the tubular member 49 by the spring 67 of FIGURE 10. Then, if the assembly is actuated, the gear 47 moves against the teeth of the member 60a forcing the end of the plunger 60 out the end of the tubular member 49 and against the switch actuating plate 66 (FIGURE 10). The teeth of the member 60a are guided in the tubular member 49 so that the plunger 60 is caused to turn slightly in the member 49 as it reaches the end of its travel.

Now, when the pin 46 is released, it retracts to the left in FIGURE 11, and the plunger 60 is also retracted by the plate 66 and spring 67 of the switch (FIGURE 9). However, due to the slight turning action mentioned above, the teeth of the member 60a ride back in different guideways against shoulders. These shoulders hold the plunger 60 in an intermediate position in the tubular member 49, so that the switch 14b remains in its second condition, as mentioned previously herein.

Then, the next time the pin 46 is actuated, the member 60a is again rotated slightly, so that its teeth are returned to the original guideways. Now, when the pin 46 is released, the plunger 60 may be retracted to its original position all the way into the tubular member 49. This enables the switch 14b to be returned to its first condition.

In the manner described, therefore, the switching mechanism of the indicator assembly described above can be actuated merely by depressing the front face of the assembly. Moreover, the assembly may be constructed so that the associated switch is alternately actuated between a first condition and a second condition by successive operations of the assembly.

It will be appreciated that the spring-loaded lamp contacts 48 are positioned to engage the contact buttons on the lamps 36 when the switch actuating mechanism of the unit 10 is in its normal position; and to maintain contact with the buttons, when the switch actuating mechanism in the unit is actuated, whereby the housing 22 is moved back into the casing 20 against the spring biasing action of the pin 46.

In the embodiment of FIGURE 12, a further modular unit 80 is interposed between the unit 10 and the switch 14. The unit 80 may be so mounted by merely unscrewing the screws, such as the screws 12 (FIGURE 1), and interposing the unit 80. The unit 80 may be any of a variety of different types of units. For example, it may be an electro-magnetic unit (FIGURE 13) which provides a holding means for the switch actuating assembly.

That is, when the switch actuating mechanism in the unit is actuated, by the housing 22 being moved telescopically into the casing 20, the pin 46 is moved into a solenoid unit 80. The movement of the pin 46 into the solenoid moves the armature 83 to the right in FIGURE 13. This causes the plunger 60 to be moved, so as to actuate the switch 14, as before. However, an internal coil 82, when energized, holds the armature 83 of the solenoid unit 80 in its displaced position, so that the plunger 60 is not released until the solenoid is de-energized. This causes the switch 14 to be maintained in its actuated electrical state, until the electric current to the solenoid coil 82 is terminated.

The modular unit 90 of FIGURE 14, like the unit 80, may be interposed between the unit 10 and the switch 14; or it may be used in conjunction with the unit 80, or other similar units.

The unit 90 may be composed of a suitable plastic, or other material. This unit provides a plurality of longitudinal chambers for conveniently mounting diodes, dropping resistors and the like. In the unit of the invention, it is often desirable for the normal available voltage to be reduced, so as to prolong lamp life.

The invention provides, therefore, a versatile modular indicator unit. The unit of the invention is exceedingly simple in its construction. The electric lamps 36 may be replaced, merely by withdrawing the housing 22 from the casing 20. The housing 22 may be completely removed from the casing 20, and the lamps 36, as well as the individual filters 42, may be easily and conveniently replaced.

Also, the other internal components of the housing 22 are readily accessible for removal and replacement. This is achieved merely by sliding the bracket 18 out from the flange 22*a*, and thereby revealing the components in the forward end of the housing.

As mentioned above, the mechanism of the invention is flexible in that separate color filters, such as the filters 43, may be used. If desired, however, these may be replaced by a single color filter, such as the filter 28 of FIGURE 7. Moreover, separate indications can be obtained by inserting the aforementioned partitions in the slots 32 (FIGURE 4).

Figure 15:
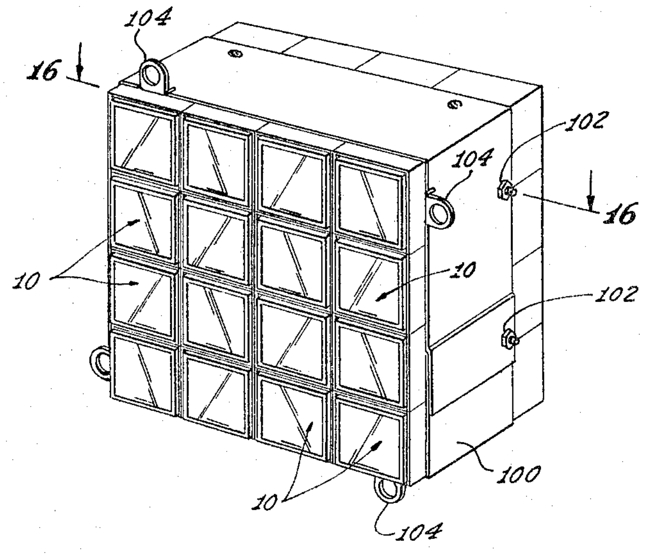
FIGURE 15 is a perspective view of a purality of units of the invention supported as a matrix for mounting on a control panel.

As mentioned above, because the front face of the unit 10 of the invention can be opened, in the manner described, without the need to grasp the edges; and because of the flush sides of the unit, a plurality of like units can be stacked together into a matrix, such as shown in FIGURE 15.

In the matrix of FIGURE 15, each unit 10 is mounted directly adjacent the contiguous units, so that minimum space is occupied by the matrix. Yet, any individual unit may be re-lamped simply and expeditiously, in the manner described, merely by releasing its front face.

The units in the matrix of FIGURE 15 are held together by means of a simple strap 100 which extends around the periphery of the matrix. The strap 100 is held on the periphery, and the individual units are held in a rigid assembly by means of screws 102. The screws

102 extend down through the grooves 10*f* (FIGURE 1) of the units.

Appropriate mounting lugs 104 may be affixed to the strap 100. These mounting lugs permit the matrix to be supported, for example, on a control panel.

When the units 10 are supported in a matrix, such as the matrix of FIGURE 15, the projections and depressions 10*b* and 10*c* (FIGURE 1) in adjacent units engage one another. These serve to hold the units against relative movement in the matrix.

It will be appreciated that the unit of the present invention includes the housing 22 which is slidable in the casing 20. All the lamp, filter and light translating components of the unit are mounted in the movable housing 22 and move with the housing.

The nomenclature strip 16 and color filter 28 are removably supported by the frame 18 at the front of the aforesaid housing 22. This assembly provides for flexibility in the unit, in that the nomenclature strip can be easily and economically replaced by another bearing different indicia. Likewise, the color filter 28 can be easily and economically replaced by others of different colors, or by a diffusing strip, if so desired.

Also the fact that all the light processing components are carried in the movable housing 22, the aforesaid partitions of FIGURE 4, for example, can be extended up to the plane of the front face of the unit and to the sides of the housing. These partitions therefore, can be constructed so that there is no leakage of light between the various compartments and color contamination at the front face does not arise.

As also mentioned, the housing 22 can be simply removed from the casing 20 for re-lamping or other purposes. Moreover, this can be achieved without inadvertently actuating the switch, as described.

The simplified modular construction and couplings of the unit also provides an extremely flexible instrument, and one that can be readily adapted to a wide variety of uses.

Figure 16:
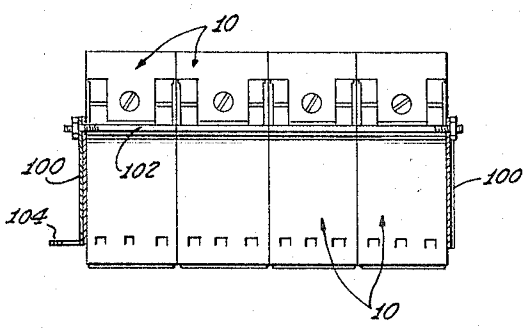
FIGURE 16 is a sectional view of the matrix of FIGURE 15, substantially on the line 16—16.

The units of the invention, as described, are susceptible to individual mounting in a control panel, or they may be mounted as a matrix, as shown in FIGURE 15. When mounted as such a matrix, the individual units may be easily removed, merely by loosening the screws 102 (FIGURES 15 and 16) which hold the strap in place.

It is to be understood that although certain embodiments of the invention have been shown and described, modifications may be made. The following claims are intended to cover all such modifications which fall within the scope of the invention.

What is claimed is:

1. An indicator/switching assembly including: a housing having a shoulder formed on the external surface thereof; a bracket mounted on said housing and extending across the rear end thereof, said bracket having a plurality of lamp-receiving apertures therein; a casing for receiving said housing in sliding telescopic relationship therewith and including inwardly extending lance means; means including a spring-loaded switch-actuator pin mounted in said casing in position to engage said housing and to bias said housing towards the forward end of said casing and said shoulder against said lance means, said switch-actuator pin being moved along said casing toward the rear end thereof by said housing when said housing is moved into said casing; and a plurality of spring-loaded resilient electrical contacts mounted in said casing in axial alignment with respective ones of the apertures in said bracket to make selective contact with electric lamps supported in said bracket and to be moved back along said casing by such lamps when said housing is moved into said casing.

2. The indicator/switching assembly defined in claim 1 in which said housing includes a lens positioned therein adjacent the forward end thereof, and in which said housing further includes a plurality of lamp-receiving apertures positioned behind said lens and in respective alignment with the lamp-receiving apertures in said bracket.

3. The indicator/switching assembly defined in claim 1 and which includes a further pin mounted on said housing in alignment with said switch-actuator pin and extending outwardly from the rear end of said housing into engagement with said switch-actuator pin.

4. The indicator/switching assembly defined in claim 3 in which said bracket, said switch-actuator pin, and said further pin are all composed of electrically conductive material so as to establish a common electrical connection to lamps supported in said bracket.

5. The indicator/switching assembly defined in claim 1 in which said lance means is in the form of at least one projection formed on the inner surface of a first side wall of said casing; and which includes resilient means for biasing said housing in a transverse direction with respect to said casing and towards said first side wall.

6. The indicator/switching assembly defined in claim 5 in which said resilient means is in the form of a resilient strip formed in the opposite side wall of said casing with respect to said first side wall.

7. The indicator/switching assembly defined in claim 1 in which said casing has flush sides and a rectangular configuration.

8. The indicator/switching assembly defined in claim 1 and which includes a switch-actuating mechanism coupled to said switch-actuator pin, said switch-actuating mechanism including a tubular member having internal longitudinal guideways formed on the inner surface thereof, and a plunger slidably and rotatably received in said tubular member, said plunger having teeth formed at one end thereof; in which said switch-actuating pin is aligned with said plunger and includes teeth engaging the teeth of said plunger so as to impart a predetermined rotation to said plunger as said plunger is moved by said pin along said tubular member; and in which said guideways are terminated so as to limit the return movement of said plunger in said tubular member for alternate ones of the predetermined rotations of said plunger by said switch-actuator pin.

References Cited by the Examiner

UNITED STATES PATENTS

| | | | |
|---|---|---|---|
| 2,877,584 | 3/1959 | Dupree | 340—378 X |
| 2,998,597 | 8/1961 | Edwards | 340—378 |
| 3,090,949 | 5/1963 | Hallerber | 340—378 X |
| 3,103,659 | 9/1963 | Edwards | 340—378 |
| 3,157,771 | 11/1964 | Roeser | 200—167 |
| 3,158,856 | 11/1964 | McMains | 340—378 |
| 3,197,598 | 7/1965 | Anderson et al. | 200—167 |

NEIL C. READ, *Primary Examiner.*

I. J. LEVIN, *Assistant Examiner.*